H. D. RUHM.
APPARATUS FOR WASHING AND RECOVERING FINES FROM PHOSPHATE ROCK.
APPLICATION FILED JUNE 22, 1908.
1,002,182.
Patented Aug. 29, 1911.
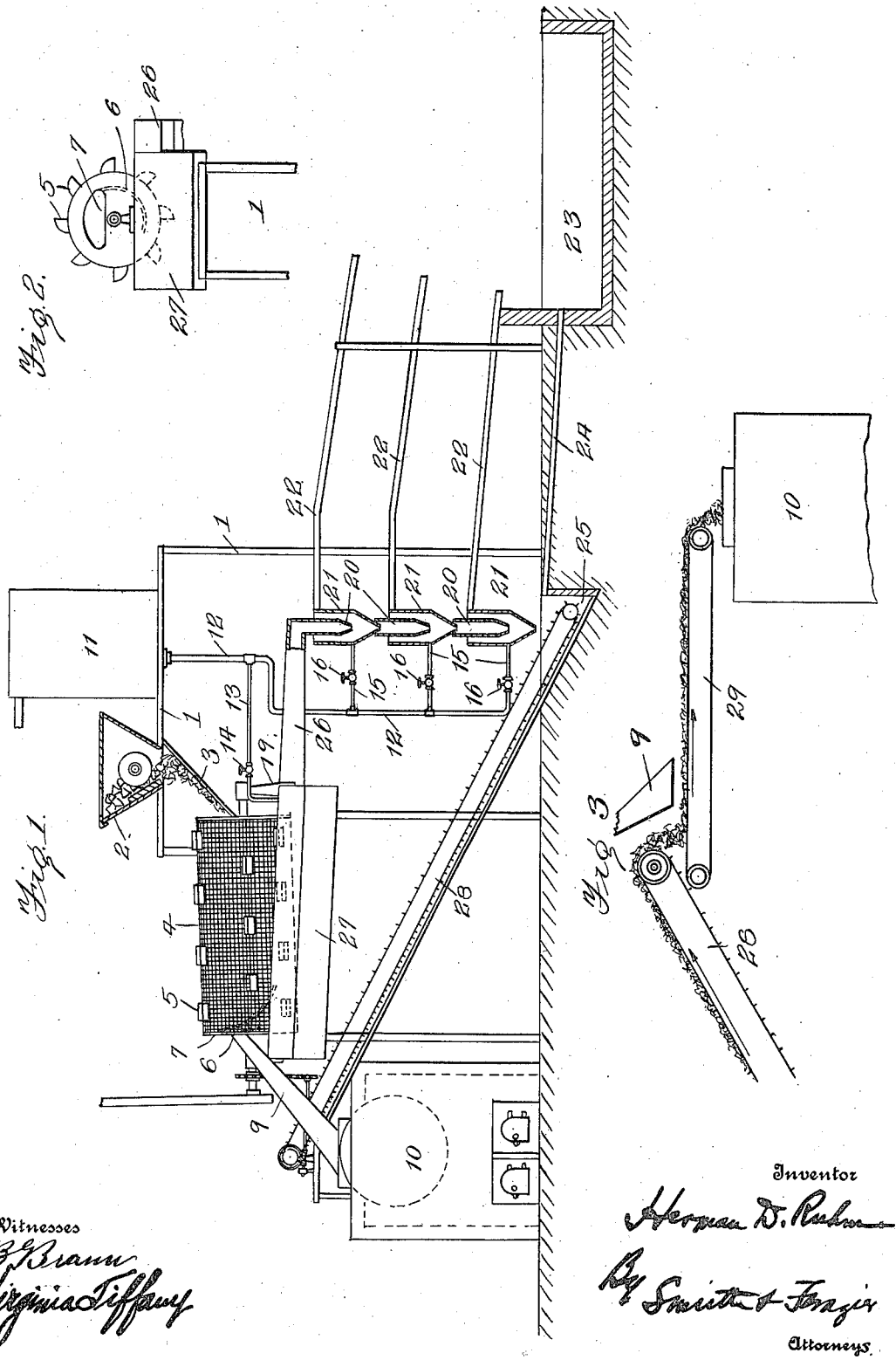

UNITED STATES PATENT OFFICE.

HERMAN D. RUHM, OF MOUNTPLEASANT, TENNESSEE, ASSIGNOR TO RUHM PHOSPHATE MINING COMPANY, OF MOUNTPLEASANT, TENNESSEE, A CORPORATION OF TENNESSEE.

APPARATUS FOR WASHING AND RECOVERING FINES FROM PHOSPHATE ROCK.

1,002,182.  Specification of Letters Patent.  Patented Aug. 29, 1911.

Application filed June 22, 1908. Serial No. 439,834.

*To all whom it may concern:*

Be it known that I, HERMAN D. RUHM, a citizen of the United States, residing in Mountpleasant, Maury county, State of Tennessee, have invented certain new and useful Improvements in Apparatus for Washing and Recovering Fines from Phosphate Rock, of which the following is a specification.

My invention relates to apparatus for washing and recovering fines from phosphate rock, and my object is to provide an improved apparatus for washing phosphate rock and recovering therefrom fine phosphate sand which has hitherto been lost or allowed to pass from the screens or washers to settling pits or reservoirs.

In the practice of washing phosphate prior to my invention it has been customary to save the particles as small as 1/16" to 1/8" in a rotary screen or on a shaking screen, and the finer particles that pass through the meshes have been allowed to pass, mixed with the clay and loam, to settling basins or pits. Sometimes these ingredients, after a certain amount has been accumulated, have been recovered, but the phosphate so mixed was of a very low grade and of little or no commercial value. As result, a considerable loss of valuable rock, in the form of sand, has attended the customary washing operations of this material. By my invention I am enabled to recover these fine phosphate sands directly from the washing apparatus in a form entirely free from admixture with clay or loam or other deleterious substances.

With the objects generally stated in view my invention consists in a novel apparatus for washing phosphate rock and recovering the fine sand therefrom, and the details thereof, as hereinafter described, and more particularly set forth in the claims.

In the drawings: Figure 1 is a side elevation partly in section showing in conventional outline an apparatus embodying my invention; Fig. 2 is an end elevation of a detail; and Fig. 3 is a fragmentary elevation in detail of a modification.

Referring to the drawings, in which the same reference numerals designate the same or corresponding parts in all the views, the numeral 1 designates a supporting frame structure of any suitable form upon which is mounted a rock crusher 2, having its discharge opening upon a chute 3, which directs the crushed rock into a revolving screen 4, of any suitable construction. This screen has preferably a series of buckets 5, arranged in staggered relation around the periphery thereof, and is driven by any suitable driving means applied to the central shaft, a belt and pulley being indicated in conventional outline in the drawings, and the shaft is shown mounted in suitable bearings upon a trough or tank 27. This trough or tank 27 is preferably slightly inclined in the direction of the discharge end of the supplemental trough 26, carried at the side thereof, while the screen is slightly inclined in the other direction.

The end plate of the screen 4 is provided with a discharge opening 7, toward which the crushed material, after passing through the screen as it revolves in the water in trough 27, is directed by means of a section of a spiral conveyer 6, arranged near the discharge end of the screen 4 and terminating at the discharge opening 7. A chute 9 is adapted to direct the washed material as it falls from the discharge opening 7 into the drier 10. This material, it should be noted, comprises the large pieces of phosphate rock that have been subject to the washing operation in the rotation of the screen 4. The finer sand and clay and loam pass through the meshes of the screen, during its rotation, into the water of the trough 7, and is there held in suspension until lifted by the buckets 5, and discharged therefrom by centrifugal force into the supplemental trough 26, through which it flows toward the tapered and covered end 26 to the hydraulic classifiers 20—21.

The water supply tank 11 is mounted upon a suitable base, such as a part of the frame 1, at a sufficient elevation to give the necessary head. This tank is connected to the trough 27 by means of a branch pipe 13 communicating with the pipe 12 leading from the tank 11. In the pipe 13 a valve 14 may be placed for controlling the flow of water therethrough. Extending from the pipe 12, below the trough 26, is a series of branch pipes 15, each provided with a valve 16 for controlling the flow of water therethrough and terminating in the chambers 21 thus affording means for supplying water to said chambers. Any number of these chambers may be used, but I have shown three in the drawings to illustrate my invention and I have found three of them to be efficient for the separation of the fine sand from the clay and loam. It is to be understood, however, that my invention is not limited to a plurality or any number of these chambers, as in some instances it may be found sufficient to employ one of them, or a greater number than three.

The tapered end of the trough 26 terminates in a downwardly projecting nozzle 20 through which the phosphate sand admixed with clay and loam is discharged into the chamber or vessels 21. The outer vessel 21 tapers to a finer discharge nozzle than the nozzle 20 entering said vessel or chamber and discharges into the nozzle 20 below it which, in turn, discharges into a corresponding chamber 21, surrounding the same, and so on. The supply for the water is preferably directed into the chambers 21, at a point about on the level with the discharge of the material from the nozzle 20, and the supply of water to each chamber is so regulated that it will be slightly in excess of the amount discharged from the corresponding nozzles of 21, thus causing the clay and loam held in suspension in the mixture of fine sand and water to gradually pass upwardly and pass out of the vessels 21 into discharge troughs or pipes 22 thence into the pit or basin 23, while the heavier phosphate sand passes in succession from each classifier into the one below and finally into a receiving pit 25. From these receiving pits the wet sand is carried by a suitable conveyer, such as a chain and flight conveyer 28, to a point above the drier or kiln and there discharged into the same for drying. The flight conveyer carrying the wet sand up out of the pit and up the inclined trough, removes the bulk of the water from said sand, said water overflowing from said pit or tank into the basin 23.

Instead of discharging the washed phosphate rock and the separated sand directly into the kiln it may be desirable to discharge these materials upon flint picking belts, such as 29 indicated in Fig. 3, from which the flint may be picked before the said belt or conveyer discharges the washed rock and sand into the kiln. Or said material may be accumulated by suitable conveyers in wet storage before going to drier.

In the operation of the apparatus I should observe that the size of the discharge opening in the bottom of the chambers 21 is regulated so as to permit the discharge therethrough of the sand while the inflow is regulated by means of the valves 15 so that just a little more water enters the chambers 21 at the sides than flows out at the bottom. The upward or counter current of water in the chambers 21 will, therefore, be regulated so as to be sufficient to carry with it the clay and loam in suspension, while it permits the sand to fall out through the discharge openings in the bottoms of the chambers 21.

By proper manipulation of the regulating valves the counter current of water through the classifiers can always be regulated to the desired degree to cause the loam and clay to float up with said current to and on through the overflow, while the cleansed phosphate sand drops through the bottoms of the chambers, and finally pass to the receiving pit.

While I have shown my invention in combination with a rotary screen washer it is to be understood that the same may be used in connection with any other suitable form of washing apparatus or one wherein shaking screens are employed, in the operation of which the phosphate rock is, during the washing operation, separated from the mixture of sand and clay or sand and clay and loam or other deleterious ingredients.

I claim as my invention:

In an apparatus for washing and recovering fines from phosphate rock, the combination of a crusher, screening means, a drier, means to deliver the coarse material from the screening means thereto, a hydraulic classifier, means to deliver the fines from the screen to said classifier, and means for returning the heavier material from said classifier to the coarse material from the screen in said drier.

In testimony whereof, I have signed my name to this specification, in the presence of two subscribing witnesses.

HERMAN D. RUHM.

Witnesses:
  A. W. CRAIGE,
  F. L. DE MARCO.